June 1, 1971   I. N. FEHR, JR., ET AL   3,582,353
EDIBLE PRODUCTS WITH LOCALIZED AREAS OF COLORING
OR FLAVORING AND PROCESS FOR MAKING SAME
Filed Feb. 19, 1968
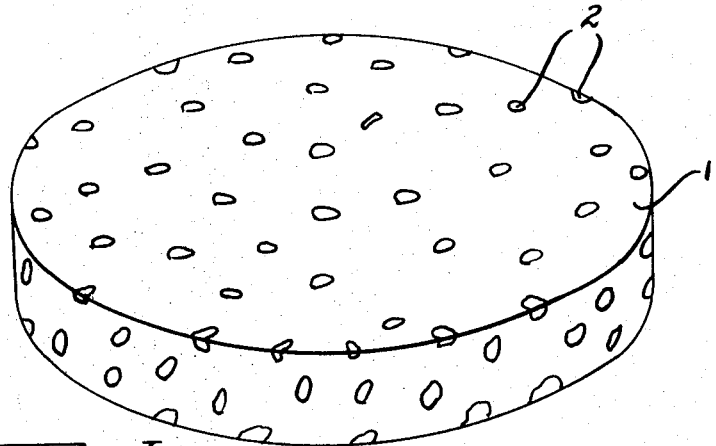
Fig. I
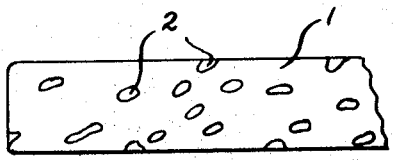
Fig. II
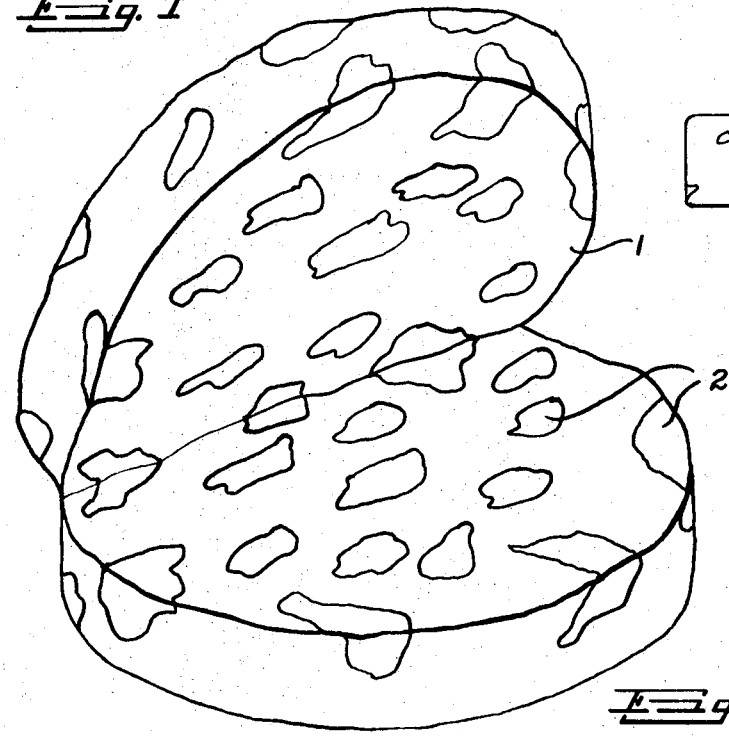
Fig. III
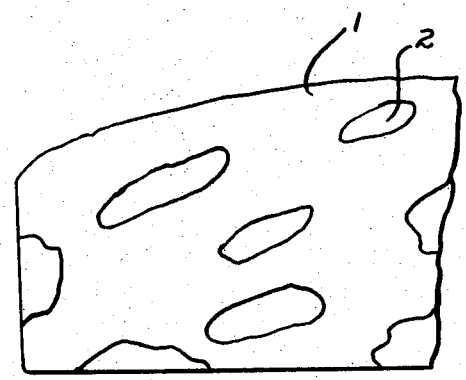
Fig. IV
ISAAC N. FEHR, JR.
RICHARD C. BINGHAM
JAMES C. PATTON
JOHN J. RUSS
RALPH H. CROCKER, JR.
        INVENTORS.
BY Howard E. Moore
        ATTORNEY

United States Patent Office 3,582,353
Patented June 1, 1971

3,582,353
EDIBLE PRODUCTS WITH LOCALIZED AREAS OF COLORING OR FLAVORING AND PROCESS FOR MAKING SAME
Isaac N. Fehr, Jr., Richard C. Bingham, James C. Patton, John J. Russ, and Ralph H. Crocker, Jr., Dallas, Tex., assignors to Campbell Taggart Associated Bakeries, Inc., Dallas, Tex.
Filed Feb. 19, 1968, Ser. No. 706,535
Int. Cl. A21d *13/08;* A23l *1/26*
U.S. Cl. 99—86                                      19 Claims

ABSTRACT OF THE DISCLOSURE

An edible food product is prepared by mixing with dough ingredients particles of relatively hard shortening material having flavoring or coloring material incorporated therein and having a sharp melting point compatible with body temperature and a relatively slow flow rate so that each particle retains its integrity within a relatively small area in the product when it is baked so as to produce localized areas of concentrated flavor or color in the baked product.

DESCRIPTION AND OBJECTS OF THE INVENTION

The shortening or flavor vehicle hereinbefore indicated is a so-called "hard fat" which is relatively hard and brittle when in solidified form, but which has a sharp melting point at or near body temperature and which will melt in the mouth similar to butter, but has a relatively slow flow rate when melted so that it is confined within a relatively small area upon melting and even when subjected to baking temperatures of 275 degrees Fahrenheit and above. A suitable method of formulating such shortening material will be described in detail hereinafter.

The flavor is incorporated in the shortening material by melting the shortening and adding thereto either liquid or powdered flavoring material, and preferably spreading same upon a flat chilled surface, or on a chilled drum to cause it to solidify, then breaking it up into irregularly shaped flakes. The flakes are then incorporated in dough or batter as it is mixed or in dry mix when packaged, so that the flakes are distributed throughout the material.

The dough is formed into desired shapes such as biscuits or rolls and packaged for sale, or if incorporated in batter, it may be added to the batter as it is being mixed and if incorporated in dry biscuit, cake or pancake mix, same can be mixed therewith upon packaging so that upon adding fluid thereto it will become a part of the batter or dough formed therefrom.

Since the shortening material having flavor material incorporated therein has a sharp melting point at a predetermined temperature, compatible with body temperature, upon placing the dough with the particles thereof suspended therein in the heated oven, the flakes will melt at the predetermined temperature and due to the size of the particles and relatively slow flow rate thereof will spread through the body of the dough at a relatively slow rate, and is confined to a relatively small area about each particle as the dough cooks. The flavor chips are of such thickness and overall dimension with a melting point such that they will maintain their integrity during mixing and shaping the end product until subjected to temperature at or above the melting point thereof. The same action occurs if the flavor particles are incorporated in batter for cooking pancakes, cake or waffles in that the particles will melt sharply at the predetermined temperature, but will be confined to a relatively small area as the batter cooks so that the flavor will be concentrated in such area to impart taste thereto. Ordinary shortening type flavor material such as oleomargarine or butter has a relatively slow melting point over a wide range, as compared to the shortening material described herein, and upon melting in baking or cooking has a relatively rapid flow rate and penetration of the dough or batter in which it is disposed so that it is dispersed throughout the material and the flavor thereof is diminished so that it is not readily identifiable visually or to the taste.

The process and product hereinafter described and claimed provides a product wherein flavor particles of meltable shortening material are dispersed throughout the dough or mixture in which it is disposed which remain intact upon the cooking of the product insofar as the flavoring is concerned and provides a product of unusual palatability.

It is therefore a primary object of the invention to provide a flavor enhancing vehicle for bakery or other food products consisting of shortening vehicle which remains intact both before baking or cooking and after baking or cooking.

Another object of the invention is to provide a shortening flavor vehicle consisting of a relatively hard, brittle shortening material which remains intact until exposed to a predetermined temperature at which it sharply melts, but has a relatively slow flow rate so that upon melting it will remain substantially intact within the food product to provide enhanced and distinct flavor and appearance at localized areas and does not disperse therein.

Still another object of the invention is to provide a flavor vehicle of the type indicated which may be incorporated in either batter, dough or dry mix and will retain the flavor in localized areas to enhance the taste thereof after cooking.

A still further object of the invention is to provide a method of adding and retaining flavor at localized areas in a bakery or other food products by adding thereto specially prepared particles of shortening material having flavoring of inert material incorporated therein, which shortening material has the characteristics of a sharp melting point over a relatively narrow range and a flow point range over a relatively narrow range so that upon melting at a predetermined temperature, the shortening material will remain substantially intact so as to concentrate the flavoring material carried therein in concentrated areas.

Other and further objects of the invention will become apparent upon reading the detailed specification hereinafter following and by referring to the drawing annexed hereto.

BRIEF DESCRIPTION OF THE DRAWING

In the drawing there is illustrated one product which may be formed by the method hereinafter described which is as follows:

FIG. I is a perspective view of an uncooked biscuit or the like showing a plurality of hard, brittle shortening flavor vehicle wafers incorporated in the dough;

FIG. II is a cross-sectional elevational view taken on the line II—II of FIG. I illustrating that the wafer particles are distributed throughout the dough;

FIG. III is a perspective view of the biscuit after it has been cooked, with the top moved upwardly to reveal that the flavor vehicle wafers upon melting remain substantially intact within the biscuit after it has been cooked;

FIG. IV is a cross-sectional elevational view taken along the line IV—IV of FIG. III showing the melted flavor vehicle material spaced throughout the body of the biscuit after it has been cooked, and illustrating and the flavor particles remain in substantially intact position in the body of the cooked material.

DESCRIPTION OF A PREFERRED FORM AND PROCESS

The shortening material employed as the flavor vehicle in the method and product herein described is a relatively hard, solid, brittle material that has a sharp melting point within a variable temperature range generally compatible with human body temperature.

Preferably, the shortening material employed has a melting point from 95 degrees to 111 degrees Fahrenheit with a flow point range of between 93 degrees and 108 degrees Fahrenheit.

This material may be formed from vegetable oil which is hydrogenized or refined by crystallization process to an extent to cause solidification of same at a rather hard, brittle consistency.

It has been found that oil obtained from the kernels of various palm nuts such as coconut oil and palm kernel oil has the characteristics most satisfactory for forming the flavor vehicle material employed in this invention. It has been found that coconut oil and palm kernel oil have the characteristic of being formed into a relatively hard, brittle, solid material and of being changed from such state to a fluid state within a temperature range of a few degrees and that the transition occurs in the range of ordinary room temperature. Coconut stearene is particularly adaptable for this purpose. As compared with butter fat and other animal fats, the sharp melting point is much more evident in material made from coconut and palm kernel oils. For instance, butter fat does not melt completely until a temperature of about 100 degrees Fahrenheit, whereas solidified coconut oil normally melts at about 76 degrees Fahrenheit which may be raised to substantially body temperature by hydrogenation. Solidified coconut oil is completely solid and hard at a few degrees below melting point whereas butter and other animal fat solids are soft at temperatures considerably below the melting point thereof.

The reason for this characteristic of coconut and palm kernel oil is that it contains a very large percentage of glyceride molecules which contain two lauric acid radicals having nearly the same melting point. These characteristics of the palm oils make it adaptable for use in this process and product wherein a change in consistency over a very narrow temperature range is desirable so that it maintains a hard state until subjected to about body temperature.

Furthermore, the low degree of unsaturation of coconut oil makes it resistant to the development of rancidity caused by oxidation so that it retains its freshness over a long period of time making it desirable in the product and method herein described.

The sharp melting characteristics of coconut and palm kernel oil from solidified state to fluid state has the advantage of giving a pleasing, cooling sensation in the mouth and the low flow rate thereof causes it to be retained in concentrated areas upon melting.

Palm kernel, coconut and palm oils are normally solid or semi-solid vegetable fat and may be hardened, and the melting point thereof raised by conventional hydrogenation in order to attain the required consistency. By hydrogenation, or crystallization, the coconut and palm kernel oils are converted into saturated fats which melt at about 95 degrees Fahrenheit or above which is higher than the original melting point, while the brittle consistency of the hardened product is much more marked than the original fat.

Hydrogenation is carried out by subjecting the oil to hydrogen and a catalyst such as finely divided nickel.

As contrasted to animal fats, the palm nut oils are much more hard and brittle, yet have a relatively low and sharp melting point. For instance, by way of comparison between coco butter and mutton tallows, these fats have almost the same fatty acid composition but the first is a hard and brittle, yet relatively low and sharp melting point fat (melting point 82–96 degrees Fahrenheit) whereas the second is plastic and greasy and melts over a relatively wide range, the final melting point (112–117 degrees Fahrenheit) being considerably higher than that of coco butter. This comparison is also true of butter and other animal fats.

Fats melt over a wide range of temperatures which varies greatly between the different fats. For instance, there is a marked contrast between the sharp melting point of a pure triglyceride (coconut or palm kernel oil) and the gradual melting of a natural fat.

The characteristic of the hard brittle shortening material having a sharp melting point over a relatively narrow range of temperatures can be acquired to some extent by proper hydrogenation of other vegetable oils such as cotton seed oils, but it has been found by experience that the use of coconut and other palm oils better provides the desired product and results.

In carrying out the method of preparing the shortening flavor carrier, the coconut oil shortening material which has been hydrogenated to form relatively hard, brittle material with a melting point from 95–111 degrees Fahrenheit with a flow point range of between 93–108 degrees Fahrenheit is melted by heating until it is in fluid state.

The desired flavoring material such as salt, cinnamon, butter flavor, sweeteners, simulated fruit, meat, fowl, vegetable, cheese, dairy flavors, yeast or artificial flavor such as an organic acid to provide a sour flavor and color material, which may be either in powdered or liquid form, are added to the melted shortening material and the material is thoroughly mixed. The mixing and agitation is continued until the shortening material is cooled and formed into the desired particle size.

A desirable way of forming the material into particle size is to deposit the shortening material, with flavor and color material therein, and while in liquid state, on a refrigerated surface and allowing it to spread thereover as it is chilled rapidly. The material is then subjected to mechanical or other physical force to break it into wafer-like particles which are relatively hard and brittle.

The flavor particles may be added to the food product in which they are to be incorporated, such as biscuit dough, and are stirred thereinto as the dough is mixed to distribute them throughout the body of the dough. The dough is then formed into the desired sizes and shapes for packaging or final cooking.

Such flavoring particles may be incorporated in refrigerated biscuits, refrigerated and frozen cookies, refrigerated or frozen dinner rolls, cinnamon rolls, sweet rolls or Danish pastry rolls, refrigerated or frozen coffee cake and other pastry products. The flavor particles may also be incorporated as a flavor carrier and stabilizer for dry mix products such as dehydrated soups, salad dressings, pizza mix and so forth, or may be incorporated to provide smoke, hickory or spice flavor, or other similar flavor carrier, in meat products such as sandwich meats, sausage, weiners, hamburger meat and so forth. The granulated product may also be used for incorporating in dry biscuit, roll, pancake or other mixes and will be suspended therein when mixed to provide spaced flavor particles throughout when cooked.

A satisfactory formula for preparation of the flavor vehicle and the incorporation of same into an uncooked edible product is as follows. The following mixture with the proportions indicated was prepared:

| | Grams |
|---|---|
| Hard shortening material (melting point 103 degrees Fahrenheit) | 2,267.95 |
| Beta carotene (coloring material) | 25 |
| Powdered butter flavor (or other flavoring material) | 85 |
| Flake salt | 107.5 |

The ingredients listed above were melted and mixed under constant agitation. The liquid was then poured into large pans in a quantity that gave a layer of liquid of approximately 1/16 of an inch in depth. The pans were then refrigerated to harden the liquid which assumed a relatively hard, brittle state of the shortening material hereinbefore described. After hardening the material was then broken into pieces of desired size, preferably within a range of two to four inches in surface diameter. Of course, the material could be cut or formed, if desired, into whatever dimensions, shapes and thicknesses desired.

The particles were then incorporated into a biscuit dough. In mixing same wtih the dough the pieces were broken into particles of approximately 1/4 inch in surface diameter. The biscuits were then formed, with the flavor particles distributed throughout the body thereof, and when baked the baked product revealed definite spots of the mixture after baking and imparted definite butter flavor (or other flavor incorporated in the flavor particles).

Other flavoring material could be substituted for the butter flavor in the shortening material. For instance, a spice such as cinnamon, chocolate, butterscotch, caramel or fruit and nut flavors could be added. However, it is desirable that the flavoring and other materials added to the shortening be inert material so as not to change the characteristics of the shortening material through the melting, mixing and resolidification process.

Yeast in suitable form, such as dry, granulated or plastic may be blended into and/or encased in the special shortening flakes to give the product in which it is incorporated a yeast-like or sour dough flavor.

A suitable example of a product incorporating flavor particles is shown in the attached drawing wherein a biscuit 1 is shown in raw, uncooked form wherein the dough thereof has mixed therein by the process hereinbefore described, flavor particles 2 of the type hereinbefore described, said flavor particles being distributed throughout the body of the dough.

FIG. III illustrates the biscuit after being cooked with the upper surface thereof raised, and showing the flavor particles therein after they have been melted and have spread outwardly to some extent but have maintained their identity in localized areas.

Upon eating the biscuit or other product the melted flavor particles will impart a definite taste of the flavor incorporated in the particles.

Having described our invention, we claim:

1. A process for preparing an edible cereal based product comprising the steps of, mixing flavoring with liquified shortening; solidifying the flavored shortening; said shortening having a sharp melting point within a temperature range which includes body temperature and a flow rate which is sufficiently slow to confine said shortening within a relatively small area in the product upon melting when subjected to baking temperature; forming the flavored shortening into discrete particles of such a size that they maintain their integrity during mixing and shaping of the end product until subjected to a baking temperature; mixing said particles of the flavored shortening with other ingredients of the cereal base product, said particles being of such thickness and overall dimension that the product when cooked has localized areas of concentrated flavor therein.

2. The process of claim 1 wherein the shortening is relatively hard and brittle in solid form.

3. The process of claim 1 wherein the particles of shortening are substantially 1/16 inch in thickness and 1/4 inch in surface diameter.

4. The process of claim 1 wherein the shortening is hydrogenated palm oil.

5. The process of claim 1 wherein the shortening is hydrogenated coconut oil.

6. The process of claim 1 wherein the shortening has a melting point in a range of between 95° F. and 111° F.

7. The process of claim 1 wherein the shortening has a flow point in a temperature range of between 93° F. and 108° F.

8. The process of claim 1 wherein the flavoring is butter flavor.

9. The process of claim 1 wherein the flavoring is cinnamon flavor.

10. A process for preparing an edible cereal based product comprising the steps of, mixing coloring material with liquified shortening, solidifying the colored shortening, said shortening having a sharp melting point within a temperature range which includes body temperature and a flow rate when melted which is sufficiently slow to retard dispersal of the coloring throughout the product, but sufficiently high to cause the coloring to be absorbed in localized portions of the product while the product is being cooked; forming the colored shortening into discrete particles of such a size that they maintain their integrity during mixing and shaping of the end product until subjected to a baking temperature; mixing said particles of the colored shortening with other ingredients of the product, said particles being of such thickness and overall dimension that when cooked the product has localized areas of concentrated color.

11. The process of claim 10 wherein the shortening is hydrogenated palm oil.

12. The process of claim 10 wherein the shortening is hydrogenated coconut oil.

13. The process of claim 10 wherein the coloring material is beta carotene.

14. The process of claim 10 wherein the uncooked product is a dough.

15. The process called for in claim 10 with the addition of the step of mixing a flavoring material with the liquified shortening such that when the discrete particles of shortening having flavoring material therein are melted, localized areas of concentrated flavor will be formed in the product.

16. A process for preparing an edible cereal based product comprising the steps of, mixing coloring material with a liquified shortening material, solidifying the colored shortening material, said shortening material having a melting point within a temperature range between 95° and 111° F. and having a flow point within a temperature range between 93° and 108° F., said shortening being characterized by a flow rate which is sufficiently slow to cause the shortening material to be retained in concentrated areas within the cereal based product upon melting; forming the mixture of shortening material and coloring material into discrete particles of such a size that they maintain their integrity during mixing and shaping of the end product until subjected to a baking temperature; mixing said particles with ingredients of the product such that the particles are suspended in the other ingredients, said particles being of such thickness and overall dimension whereby cooking the ingredients forms a cereal based product having distinct areas of color spaced therethrough.

17. The process called for in claim 16 with the addition of the step of mixing flavoring material with the liquified shortening such that when the ingredients are cooked the product has distinct areas of flavor spaced therethrough.

18. An edible cereal based product prepared by the process of claim 1.

19. An edible cereal based product prepared by the process of claim 10.

References Cited

UNITED STATES PATENTS

| | | | |
|---|---|---|---|
| 2,522,591 | 9/1950 | Wilson et al. | 99—92 |
| 2,785,983 | 3/1957 | McMath | 99—140 |

RAYMOND N. JONES, Primary Examiner

J. R. HOFFMAN, Assistant Examiner

U.S. Cl. X.R.

99—92, 140, 148